United States Patent [19]

Klein

[11] 4,155,622
[45] May 22, 1979

[54] MICROSCOPE WITH INTERNAL FOCUSSING

[75] Inventor: Friedrich Klein, Wedel, Fed. Rep. of Germany

[73] Assignee: J. D. Möller Optische Werke GmbH, Wedel, Fed. Rep. of Germany

[21] Appl. No.: 883,647

[22] Filed: Mar. 6, 1978

Related U.S. Application Data

[63] Continuation-in-part of Ser. No. 771,759, Feb. 24, 1977, abandoned, which is a continuation of Ser. No. 598,813, Jul. 24, 1975, abandoned.

[30] Foreign Application Priority Data

Aug. 20, 1974 [DE] Fed. Rep. of Germany ....... 2439820

[51] Int. Cl.² ............................................. G02B 7/04
[52] U.S. Cl. ............................... 350/47; 350/175 ML
[58] Field of Search .................... 350/47, 46, 41, 77, 350/81, 82, 175ML, 232, 325, 255

[56] References Cited

U.S. PATENT DOCUMENTS

| 2,937,570 | 5/1960 | Hillman | 350/47 |
| 3,069,972 | 12/1962 | Tibbetts et al. | 350/47 |
| 3,176,583 | 4/1965 | Klein | 350/175 ML |

Primary Examiner—Jon W. Henry
Attorney, Agent, or Firm—Toren, McGeady and Stanger

[57] ABSTRACT

A floor or ceiling support mounted microscope for microsurgery wherein the microscope includes an objective of variable intercept length. The objective consists of at least two lens assemblies movable relative to each other. One of the two lens assemblies may be exchangeable against similar assemblies of different focal lengths.

1 Claim, 4 Drawing Figures

MICROSCOPE WITH INTERNAL FOCUSSING

This is a continuation-in-part application of Ser. No. 771,759 filed Feb. 24, 1977 and now abandoned which is a continuation of Ser. No. 598,813 filed July 24, 1975, now abandoned.

The present invention relates to a floor or ceiling mounted microscope for microsurgical applications which includes a viewing unit, an eyepiece and an objective.

High quality microscopes for microsurgical applications include a variety of modular units that may be interchangeably assembled and which by their different properties and performance allow ready adaption to the pecularities of different microsurgical requirements.

The base model of such a microscope for microsurgery includes a viewing unit with eyepieces and an objective. The viewing unit is a binocular afocal system. The viewing unit and the objective are interconnected by an element which simultaneously serves as a mounting or a support for the microscope and allows performance of further functions such as focussing by means of a traveling carriage guide or the tilting of the microscope about an axis within a fork type bracket.

Viewing units with different viewing angles are available, such as for straight-line viewing, for viewing at an angle of 45° and the like. The eyepieces are generally exchangeable so as to further broaden the possibilities of varying the magnification.

Objectives may be supplied at various focal lengths, ranging generally from 125 to 500 mms, and the objectives will be selected according to the working distance required.

The overall magnification of the microscope is dependent upon the viewing unit, the eyepiece and the selected objective. For modifying or respectively enlarging the available range of microscope magnification may furthermore be employed a magnification changer that is mounted intermediate the viewing unit and the objective. Magnification changers are generally afocal systems in the form of step-by-step magnification changers, preferably Galileo systems mounted on indexing drums, or in the form of continuously variable zoom lens magnification changers.

Further accessories for these microscopes are beam splitters that are mounted intermediate the viewing unit and the magnification changer and allow by means of additional objectives to extend the microscope ray path likewise to photographic, movie and television cameras or dual viewer units.

The illumination unit generally consists of lamps some of which are adjustable and illuminate the field of view laterally at small angles. These lamps are mounted behind the objective and illuminate the object approximately in a direction coaxial with the objective.

By the increased usage of television, movie and photographic cameras the handling of such microscopes becomes more and more cumbersome. In the above described design the center of gravity of such additional apparatus cannot be made to coincide with the horizontal pivot axis of the microscope, or rather intricate swiveling means would be required.

For usage during operations, the microscopes of the above described type are mounted on floor or ceiling supports. Most of these supports provide for motor-driven height adjustment whereby this height adjustment might also be used for focussing the microscope when the latter is used in a vertical alignment. When the microscope is tilted, however, focussing must be performed by means of the swiveling carriage of the mounting. Toward this end, this carriage generally includes manual or motor-driven adjustment means. Manual focussing constitutes a severe handicap for the operating surgeon since in most cases he would need both his hands for the operation. Motor-driven focussing, on the other hand, which is suitably controlled by a pedal switch, requires many additional space-consuming accessories such as a gear box and a motor for adjusting a microscope that may be provided e.g., with a television camera and a dual viewer unit. In either case, the adjustment range is rather restricted since the carriage guide cannot have any desired length for reasons directly resulting from the application. Furthermore, there will be encountered a wide displacement range for the center of gravity, and this must be accommodated by the pivot axis of the mounting.

It is therefore the main object of the present invention to provide a microscope that is suitable for microsurgery in which the above described disadvantages of heretofore known microscopes are avoided and in which the microcscope including all attached peripheral units need no longer be moved when focussing the microscope.

For achieving this object, there is now proposed, in accordance with the present invention, a microscope including an objective of variable intercept length having at least a combination of two lens assemblies in the form of a stationary negative lens assembly facing the viewing object such as the operational field or the like, and a movable positive lens assembly.

These objective lens assemblies include a positive lens assembly having a focal length in the range from 110 to 130 mms and being displaceable within a range from 16 to 20 mms., and a negative lens assembly that is adapted to the respective focussing range.

Moreover, the negative lens assembly may be exchangeable against other negative lens assemblies of different focal lengths.

A microscope of this type is very advantageous since the microscope including all peripheral units need no longer be moved when focussing the microscope. For moving the positive lens assembly merely a small power is required. The small displacement range of the positive lens assembly moreover provides for a rapid change of depth adjustment. The surgeon or his assistant need no longer move his head along with the microscope, as in heretofore known microscopes.

An embodiment of the microscope of the present invention is shown in the appended drawings wherein FIG. 1 is a schematical lateral elevational view of a microscope with its various assemblies;

Figure 1:
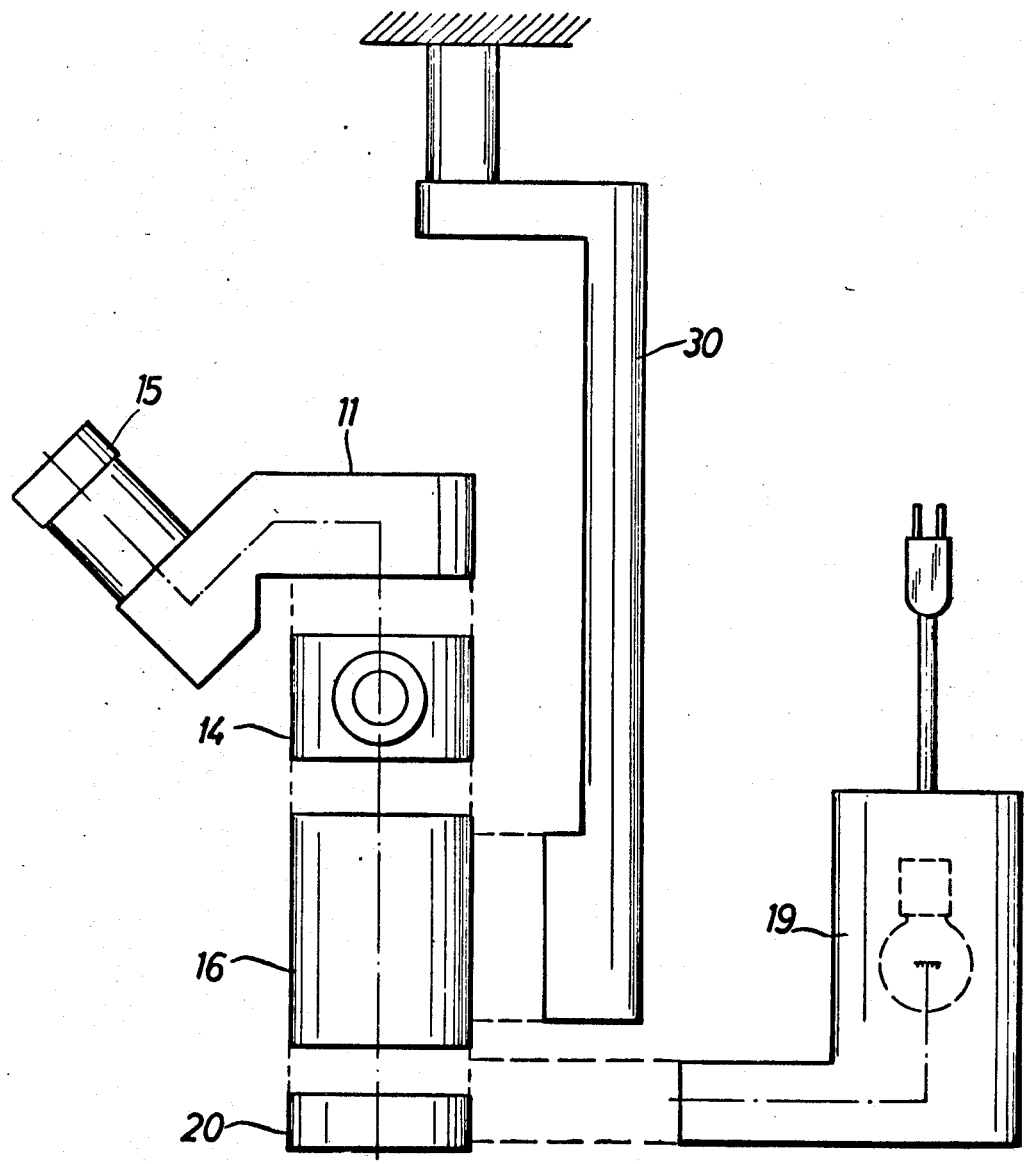
Figure 2:
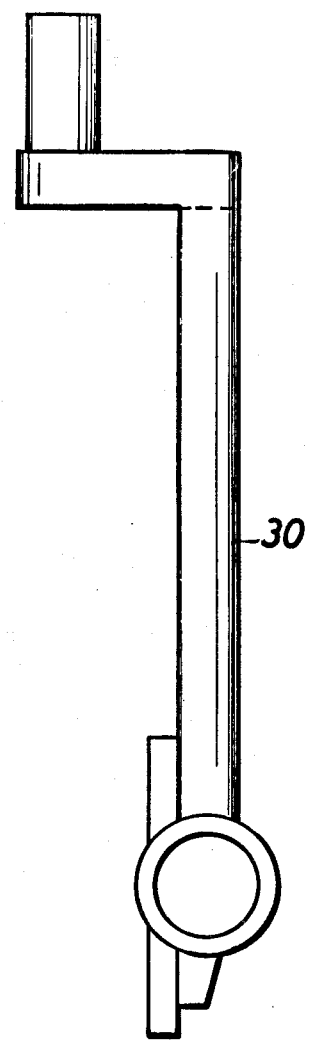
FIG. 2 is a lateral elevational view of the microscope support with coaxially arranged pivot and carriage adjustment axes.
Figure 3:
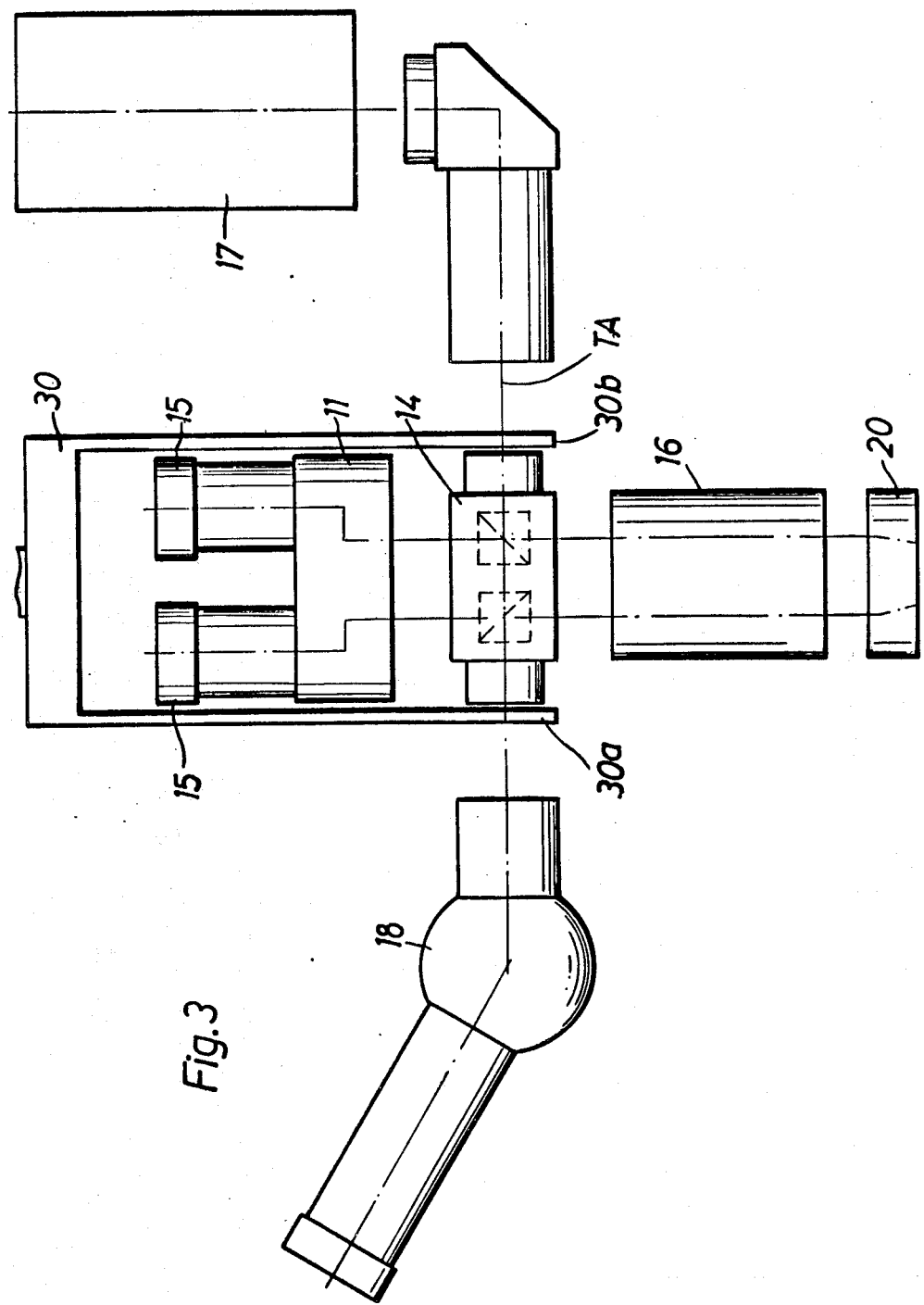
FIG. 3 is a schematical front elevational view of a microscope with dual viewer unit and a camera, illustrating the various assemblies.

Referring to the embodiment of a microscope in accordance with the present invention shown in FIGS. 1-3, the microscope is designated by the reference 10. The microscope includes a housing for receiving a viewing unit 11 with eyepieces 15, and an objective 20.

The overall arrangement is mounted in a suspension mounting 30. This suspension mounting 30 may form part of a floor or ceiling support not shown in the drawings. The mounting 30 holds the microscope and in the embodiment according to FIG. 2 also allows tilting of the microscope. The viewing unit 11 may provide any of several different viewing directions, i.e. straight-through viewing, viewing at an angle of 45° and the like. The objectives may have as desired any of various focal lengths. The overall magnification of the microscope is predetermined by the viewing unit 11, the eyepiece 15 and the objective 20. For enlarging or modifying the microscope magnification may be provided a magnification changer 16 that is mounted intermediate the viewing unit 11 and the objective 20.

As may be seen from the embodiment of FIGS. 1 and 3, the microscope housing may receive further components such as a beam splitter 14 mounted intermediate the viewing unit 11 and the magnification changer 16. A photographic camera, a movie camera or a television camera indicated generally by the reference 17, and a dual viewer unit 18 may likewise be provided. The camera 17 and the dual viewer unit 18 participate in the viewing path of the microscope. The reference numeral 19 designates an illumination unit.

Figure 4:
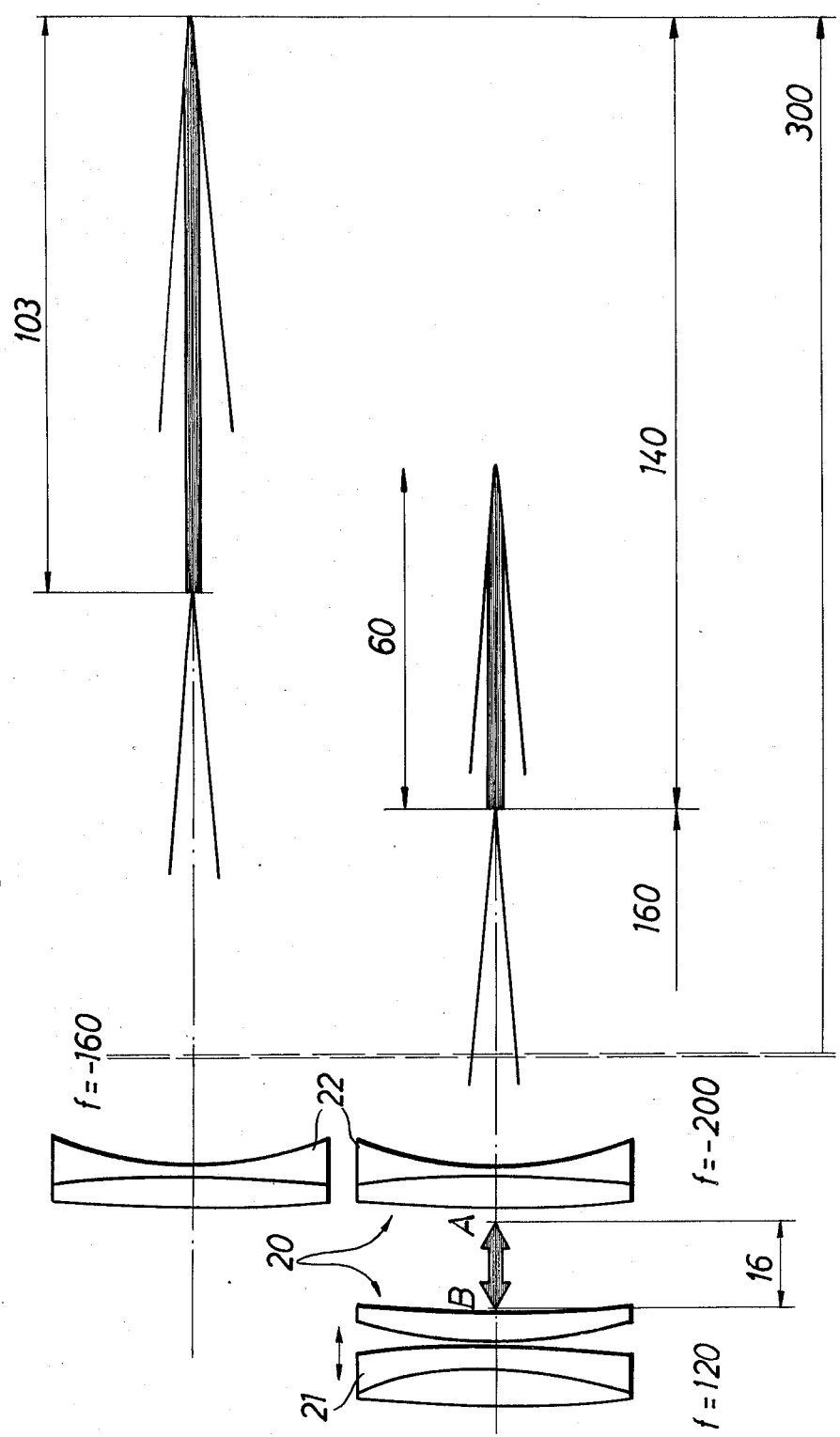
FIG. 4 is a schematical illustration of the objective lens assemblies for different focal lengths, consisting of a movable positive lens assembly and a negative lens assembly, and showing the working ranges.

In the microsurgical microscope of the present invention is employed an objective 20 of variable intercept length. The objective 20 includes two lens assemblies, i.e. a stationary negative lens assembly 22 facing the viewing object such as the field of operation or the like, and a movable positive lens assembly 21 (FIG. 4). The positive lens assembly 21 may be moved by any of a variety of suitable conventional means such as traveling carriages or the like.

It has been found that a particularly advantageous and suitable focal length for the positive lens assembly 21 is in the range from 110 mms. to 130 mms. when the displacement range of the same is within the range from 16 mms. to 20 mms. The focal length of the negative lens assembly 22 is of course prescribed by the desired focusing range. This focusing range may be enlarged by employing different negative lens assemblies 22 which may be mounted in a turret arrangement in thus allowing to replace the negative lens assembly 2 by negative lens assemblies of different focal lengths. The alteration of the intercept length results in an alteration of the focal length. With the above indicated data for the positive lens assembly 21 the range of focal lengths is restricted to an order of magnitude that does not interfere, and may moreover be compensated for by a zoom lens magnification changer.

In the embodiment shown in FIG. 4 is employed a three-lens positive lens assembly 21 and a two-lens negative lens assembly 22. When moving the positive lens assembly 21 having a focal length f=120 mms through a distance of 16 mms. from point A towards point B, the focus will shift from 160 to 220 mms when employing a negative lens assembly of f=−200 mms. When employing a negative lens assembly having f=−160 mms., the focal point will shift from 197 to 300 mms.

The invention is based upon the recognition that it is possible to afford a microsurgeon the opportunity of focus a microscope from a first region, e.g., the surface of a brain, to a second region, e.g., a deeper tumor, without changing the distance of the microscope from the brain surface and with a comparatively small microscope. This is done by deviating from two conditions of known objective lenses. Specifically, the invention departs from the known situation in which a plano-concave and a plano-concave lens are set close to each other to form an objective, and further relinquishes the opportunity to focus on infinity.

The present invention departs from the known situation in which two lenses of practically identically focal length but opposite sign, which are preferably plano-concave and plano-convex lenses, are set close to each other. In order to keep the aberrations small, the negative element is arranged as a front lens.

In such a known device the refractive powers cancel each other out, the system has infinite focal length. In such systems $$1/f = \phi_1 + \phi_2 - \omega_1' \phi_1 \phi_2$$

where f is the total focal length of the system, $\phi_1$ and $\phi_2$ the individual refractive powers of the two elements, and $\omega_1'$ the distance between the principal points. If $\phi_2 = \phi_1$ and $\omega_1' = 0$, we have $1/f = 0$ and $f = $ infinity. If $\omega_1'$ has a positive value, $1/f = \omega_1' \phi_1^2$. The focal length of the system is thus positive, as intended. By varying $\omega_1'$, it is thus possible to focus from an infinite to a finite value.

The invention deviates from the condition $\phi_1 = \phi_2$ and $-\phi_2$ is set so that the $\omega_1'$ becomes very small for the largest distance to be achieved. In the present invention, a focal length of $-200$ mm is achieved with a focal distance of 220 mm, for a distance $\omega_1'$ of about 2 mm. Hence the maximum overall length for the shorter focal distance of 160 mm is obtained with $9 + 18 + 18 = 44$ mm.

The focal length of the entire lens system is preset by the spacing between both principal points of the lens systems and the refractive coefficients. the invention relinquishes an infinity focus. Known systems are always equipped with a lens system, which start out from an infinite positions to reach a close-proximity position. With the subject of the application, however, operation is always effective with a lens system between two finite points. Refractive powers and/or coefficients are selected here, so that a short shift is required.

The present microscope has an object enlargement device for microsurgical purposes. The problems in microsurgical operations, e.g., brain operations, or generally in situations involving operation-created body cavities or natural body cavities, exist from the point of view of the surgeon.

For mounting of instruments, a specified distance must be maintained between microscope objective and other field of operation.

The invention permits adjusting the focus, e.g., between head surface and a deeper tumor, without changing the distance of the microscope from the head surface. Thus, no movement of the microscope occurs, and thus no change in distance to the surgical surface within the site. The working space for surgical instruments is not changed, so that the perception of the surgeon for his instruments need not be changed. Among other senses, the operator tunes in his sense of awareness to a specific instrument location; that way a special feeling is produced for handling instruments involved. If the microscope forces a change in the instrument location, then the operator must adjust himself to this new situation. Such adjustment is just what must be avoided.

This was not possible in prior art devices. With all known systems the distance of the microscope from the operating field had to be changed. A lens system as with the present invention has never been used with known systems and microscopes.

The working distance between object and microscope was varied in known devices for microsurgery by mechanical adjustment of the entire microscope in adaptation to the site of operation. Since microsurgical operations in the human brain are performed at depths of up to 15 cm, such mechanical displacements of the micrscope while focusing have a highly adverse effect since the working distance required for the surgical instruments is not sufficient in these fields deep in the brain, and that it was necessary for this reason to use instruments with short dimensions. This was naturally very disadvantageous for the entire operative technique. But if microscopes with focusing according to the present application are used, the working distance between the site of operation and the microscope always remains constant. Independent of the depth of the site of operation in the head or in the brain of the patient, a constant working distance is always maintained so that the surgical instruments can be freely handled. Another disadvantage of the microscopes with mechanical displacement was that the surgeon operating the microscope had to take part in this procedure himself, namely by turning his head correspondingly. Particularly in microsurgical operations, it is necessary that the surgeon alternately observe the site of operation in its entire depth and also has the possibility of observing the area outside the site of operation proper, that is, the area marked by the incision, in a very short time and without major displacements.

While specific embodiments of the invention have been shown and described in detail to illustrate the application of the invention principles, it will be understood that the invention may be embodied otherwise without departing from such principles.

What is claimed is:

1. A microscope assembly particularly suited for microsurgical applications having a viewing end and an objective end, said assembly comprising an eyepiece located at said viewing end and defining the location at which the eye of a viewer may be placed to view an object through said assembly, an objective at said objective end consisting essentially of at least one two-membered lens unit including a negative lens member and a positive lens member, said negative lens member being the outermost lens member of said microscope assembly located closest to an object to be viewed, said positive lens member being located adjacent said negative lens member between said eyepiece and said negative lens member and being movable relative to said negative lens member and said eyepiece, with movement of said positive lens member relative to said negative lens member and said eyepiece, while both said negative lens member and said eyepiece remain fixed relative to an object to be viewed, operating to change the focal distance of said microscope assembly so that said microscope assembly may be refocused without requiring movement of either said eyepiece or said negative lens member, said positive lens member consisting essentially of a positive lens assembly having a focal length in the range between 110 to 130 mm and being displaceable within a range between from about 16 to 20 mm, said negative lens member consisting of a negative lens assembly adapted to the respective focusing range of said positive lens assembly.

* * * * *